(12) United States Patent
Mooney

(10) Patent No.: US 7,499,836 B1
(45) Date of Patent: *Mar. 3, 2009

(54) APPARATUS FOR AND METHODS OF DETECTING COMBUSTION IGNITION

(75) Inventor: Jonathan Martin Mooney, Irvine, CA (US)

(73) Assignee: Solid State Scientific Corporation, Hollis, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/481,572

(22) Filed: Jul. 6, 2006

Related U.S. Application Data

(63) Continuation-in-part of application No. 11/397,355, filed on Apr. 4, 2006, now Pat. No. 7,155,354, which is a continuation-in-part of application No. 10/753,143, filed on Jan. 7, 2004, now abandoned.

(60) Provisional application No. 60/696,911, filed on Jul. 6, 2005, provisional application No. 60/438,375, filed on Jan. 7, 2003.

(51) Int. Cl.
*H04B 15/00* (2006.01)

(52) U.S. Cl. .......... 702/189; 702/65; 702/71; 356/303

(58) Field of Classification Search .......... 702/189, 702/65, 71, 75–77, 80, 181–90; 356/303, 356/305, 306, 320; 382/212, 216, 291
See application file for complete search history.

(56) References Cited

U.S. PATENT DOCUMENTS

| 5,793,889 | A  | * | 8/1998  | Bushman    | 382/221 |
| 5,999,652 | A  | * | 12/1999 | Bushman    | 382/221 |
| 7,155,354 | B1 | * | 12/2006 | Mooney     | 702/65  |
| 2007/0092109 | A1 | * | 4/2007 | Lee et al. | 382/103 |

* cited by examiner

*Primary Examiner*—Eliseo Ramos-Feliciano
*Assistant Examiner*—Phuong Huynh
(74) *Attorney, Agent, or Firm*—Louis J. Franco; Law Office of Louis J. Franco

(57) ABSTRACT

A remote sensor for detection of the initiation of combustion includes a broad-band sensor, associated signal processing and an interface to the user. The sensor uses the signature formed by the temporal evolution of the spectral emission intrinsic to combustion as a fingerprint for detecting the combustion. The sensor can autonomously monitor a scene and issue an alert as warranted.

1 Claim, 13 Drawing Sheets

Representative electromagnetic wavelengths as registered by the imaging sensor array 300 at the focal plane $P_F$

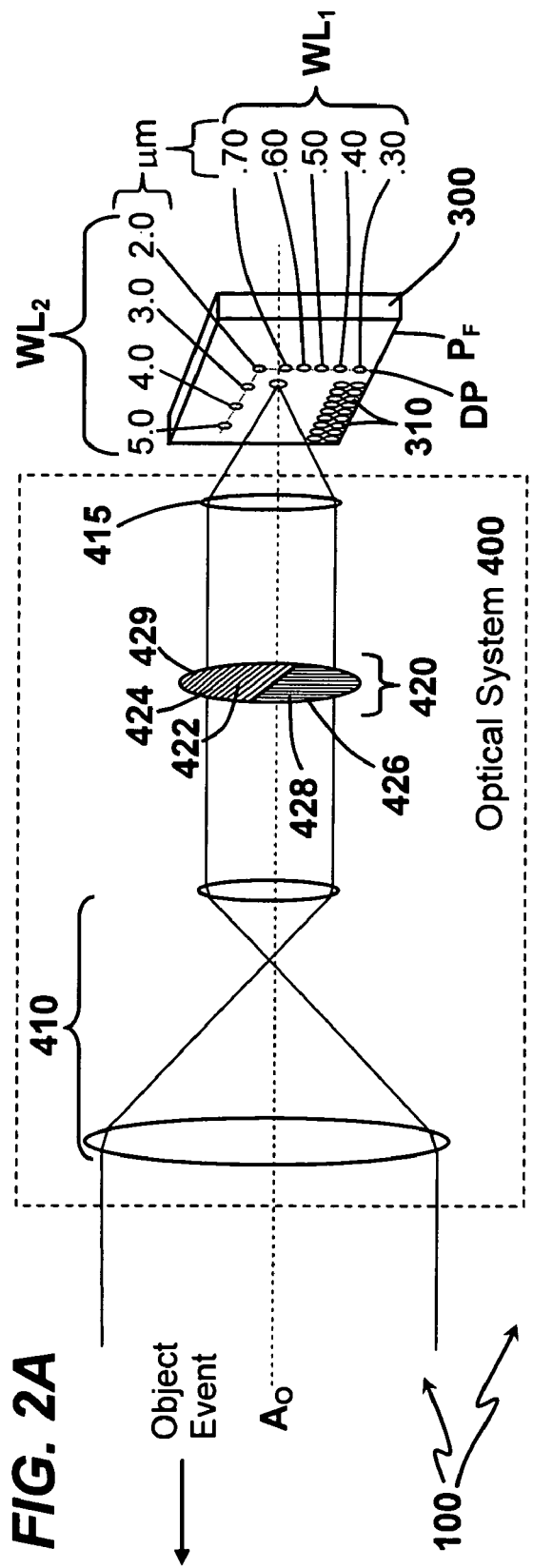

Representative electromagnetic wavelengths as registered by the imaging sensor array 300 at the focal plane $P_F$ NDIL at x=16, y = 15

Illustrative Data 250 indicative of the registered dispersion pattern 255

| WAVELENGTH μm | X-VALUE | Y-VALUE | INTENSITY |
|---|---|---|---|
| ....... | | | |
| 5.0 | 4 | 21 | .3 |
| 4.0 | 6 | 22 | .9 |
| 3.0 | 10 | 24 | .7 |
| 2.0 | 15 | 25 | .5 |
| 1.0 | 21 | 25 | .2 |
| .90 | --- | --- | 0 |
| .80 | --- | --- | 0 |
| .70 | 24 | 22 | .3 |
| .60 | 26 | 19 | .5 |
| .50 | 27 | 16 | .7 |
| .40 | 28 | 12 | .1 |
| .30 | 28 | 9 | .05 |
| .20 | --- | --- | 0 |
| ....... | | | |

Coarse Location Estimate

MWIR box

Visible-SWIR box

Refined Location Estimate

Line fit to each arm

APPARATUS FOR AND METHODS OF DETECTING COMBUSTION IGNITION

CROSS-REFERENCE TO RELATED APPLICATIONS/PRIORITY CLAIMS

The present application is a continuation-in-part of U.S. application Ser. No. 11/397,355 filed Apr. 4, 2006 now U.S. Pat. No. 7,155,354, under the title "APPARATUS FOR AND METHODS OF ANALYZING THE SPECTRAL SIGNATURE OF A DYNAMIC EVENT," which is a continuation-in-part of U.S. application Ser. No. 10/753,143 filed Jan. 7, 2004 now abandoned under the title "APPARATUS FOR AND METHODS OF ANALYZING THE SPECTRAL SIGNATURE OF A DYNAMIC EVENT." Application Ser. No. 11/397,355 was co-pending with the present application on the date the present application was filed.

Previously filed Non-provisional application Ser. No. 10/753,143 was based on, and claimed the benefit of the filing date of, Provisional Application Ser. No. 60/438,375, filed on Jan. 7, 2003, and entitled "SPECTROMETER FOR CHARACTERIZATION OF UNCUED DYNAMIC EVENTS." The present application also claims the benefit of the filing date of Provisional Application Ser. No. 60/438,375 through Non-provisional application Ser. Nos. 11/397,355 and 10/753,143. Moreover, the present application includes subject matter based on, and claims the benefit of the filing date of, Provisional Application Ser. No. 60/696,911, filed on Jul. 6, 2005, and entitled "APPARATUS AND METHODS FOR DETECTING COMBUSTION IGNITION." The entireties of the disclosures of the previous non-provisional and provisional applications, including the drawings, are incorporated herein by reference as if set forth fully in the present application.

BACKGROUND

1. Field

Implementations of the present invention relate generally to the passive detection, classification and identification of combustion events (e.g. muzzle flash from a gun, the flash from an explosion, or the plume of a rocket), more particularly to threat warning systems used to passively monitor potential threats. Each of the various implementations further involves a method for autonomously monitoring the environment and detecting combustion events, a method for capturing and analyzing the event signature, and a method for rendering a determination of the identity of the event in a timely fashion.

2. Brief Description of an Illustrative Environment and Related Art

Passive warning systems autonomously detect and declare threats based on observable quantities intrinsic to the event. These sensors also report the location of the event so that appropriate countermeasures can be initiated. For combustion events, the combustion itself is intrinsic to the event, and the signature from combustion invariably contains strong thermal emission signatures due to the high temperatures that are inherent to burning materials.

Guns, rockets and bombs are all heat engines that use explosive materials to perform mechanical work. The explosive materials undergo a very rapid transformation into more stable materials thereby releasing heat, which is converted to mechanical energy. The process of creating the heat leads to fluorescence of some of the constituents, while the heat itself leads to blackbody radiation from the gasses present in the immediate vicinity of the explosion.

The explosive materials selected for a specific application depend on the application. Low explosives create sub-sonic explosions, while high explosives are capable of super-sonic explosions that result in a detonation shock wave with a powerful blast. Explosives are also classified as primary or secondary based on susceptibility to ignition. Primary explosives are highly susceptible to ignition and are therefore unstable. Secondary explosives are more stable, but more difficult to ignite. Invariably a combination of explosives is used to obtain the appropriate balance of explosive energy and ignitability.

Propellants are used in guns and rockets. Rocket propellants are typically based on a rubber binder, ammonium perchlorate oxidizer and a powdered aluminum fuel. Gun propellants are usually nitrocellulose or nitrocellulose and nitroglycerine. Explosives for bombs fall into three major classes, nitroaromatics (e.g., tri-nitrotoluene or TNT), nitramines (e.g., hexahydro-1,3,5 trinitroazine or RDX), and nitrate esters (e.g., nitrocellulose and nitroglycerine).

Combustion events radiate strongly across a wide band of the electromagnetic spectrum, typically covering the visible, near infrared, short-wave infrared and the mid-wave infrared regions (0.5-5.5 um). The observed signatures depend on the temperature, size, and constituents of the flash when it is visible.

The signatures can have a temporal duration of less than $\frac{1}{500}$th second or longer than a minute. The temporal evolution can be an abrupt rise and fall, or it can have multiple maxima intermixed with long regions of constant emission. Often the spectral content varies in time, which is typically observed as a shift in the color temperature in time.

When an event location is known, conventional spectral imaging techniques are adequate for characterizing the spectral signature of the combustion. Spectral imaging is the art of quantifying the spectral and spatial characteristics of a scene within a "field of view." Optical devices known generally as imaging spectrometers have been developed for measuring and analyzing the spectral content of electromagnetic radiation in various ranges within the spectrum of optical wavelengths. These include, by way of non-limiting example, the ultraviolet; visible; and near, short-wave, mid-wave and long-wave infrared ranges of the electromagnetic spectrum. For purposes of this specification, and the appended claims, all wavelengths of the electromagnetic spectrum are included within the definition of "light," regardless of visibility with respect to the human eye. In other words, the terms "light," "electromagnetic energy" and "electromagnetic radiation" are regarded as wholly interchangeable and may be used interchangeably throughout the specification.

Spectral images are typically acquired by scanning the image of a slit across the image of an overall scene, but many hardware configurations that execute alternative imaging modes are available. A spectral image usually consists of a sequence of monochromatic images, wherein each monochromatic image represents the scene as it would appear when viewed over a limited wavelength band and each image in the sequence is centered at a unique wavelength. Accordingly, spectral images are inherently three-dimensional (i.e., they include two spatial dimensions and one spectral dimension) and, therefore, some type of multiplexing is required in order to acquire and display the data in two dimensions.

Three current and emerging multiplexing methods are (1) temporal multiplexing, (2) multiplexing at the image plane and (3) multiplexing at a pupil. Temporal multiplexing is commonly used to acquire image data; however, temporal multiplexing introduces artifacts when the scene is not static. Therefore, most spectral imagers work well for scenes consisting of static objects, but fail to accurately represent scenes including events that evolve rapidly in time (i.e., combustion events).

Since combustion events evolve rapidly in time and their location is unknown, conventional sensors are not able to satisfactorily characterize their signatures. Accordingly, a need exists for a method and apparatus for analyzing and characterizing the spectral signature of combustion events in an environment where their location and timing is unknown.

SUMMARY

Various implementations include an optical sensor and integral detection processing. The optical sensor is configured to spatially encode the spectral signature of combustion so that it can be easily be detected. The sensor encodes the signal from the event as a function of both wavelength and time. The detection processing integral to various implementations of the invention evaluates the encoded signature and declares the presence of combustion when appropriate.

According to a general set of implementations, alternative methods of detecting, locating and identifying unknown surprise combustion events include combinations of some or all of the steps to be described.

Various implementations include providing a method for autonomously detecting the presence of an unanticipated combustion event over a large field of view. The detection processing integral to various implementations of the invention evaluates the encoded signature and declares the presence of combustion when appropriate. Once detection has been declared the data is processed to classify and identify the event.

An element common to various alternative embodiments is the inclusion of a sensor capable of sampling the event signature with temporal resolution sufficiently high to capture the event signature so classification can be performed unambiguously. The temporal characteristics of interesting events require sampling at rates in the range of 100-1000 Hz, for example, where smaller events require higher rates. The sensor is also capable of sampling the event spectra with sufficient spectral resolution to capture the event signature so that classification can be performed unambiguously.

Since combustion event signatures change rapidly in time it is important to sample all of the spectral bands simultaneously. Accordingly, in various implementations, the spectral sensor simultaneously samples various selected wavelengths within the event spectrum. In the absence of simultaneous event-spectrum sampling, features in the temporal evolution will appear as features in the spectral resolution, which will degrade the classification performance. Various implementations include an optical sensor that is configured to spatially encode the spectral signature of combustion in order to facilitate simultaneous sampling of various wavelengths within a combustion event spectrum with a snapshot staring Focal Plane Array. The sensor encodes the signal from the event as a function of both wavelength and time.

The spectral characteristics of interesting events dictate the wavelength band(s) over which the sensor operates. The color-temperature of most combustion processes is approximately 2000-3000C, but often contains strong spectral features in the visible and in the MWIR. It follows that the spectral band of interest ranges from 0.4 to 5.5 um. In one embodiment, the sensor covers this entire band; however, this embodiment is not optimal for weak muzzle flashes from which there is relatively little emission in the visible range. Alternative embodiments limit the spectral band to optimize performance for specific types of events. In a typical implementation, the spectral band of the sensor includes wavelengths at which events of interest emit prominently and, in order to facilitate the differentiation of disparate event types within an event class, includes sensitivity in spectral regions in which the spectral signatures of event-class members are sufficiently dissimilar from one another.

Ina typical implementation, the sensor facilitates location determinations for unanticipated events. The location estimates for each instant are combined to form a continuous track estimate. The sensor is able to detect, track and classify multiple events simultaneously. Various implementations include providing a combustion event dictionary containing data relative to a plurality of standardized known events. Each known event has a corresponding standardized combustion event signature in terms of the spectrum as a function of time. An illustrative event dictionary includes event signatures associated with a plurality of mortars at varying charges, howitzers at varying charges and a variety of bombs, for example. The sensor can reject measured (or registered) signatures that are inconsistent with combustion events or interest, and identify such signatures as originating from false targets. Various implementations of the sensor are able to identify a combustion event by comparing the measured signature (signature registered by the imaging-sensor array) to those events associated with "stock" signatures in the event dictionary. The sensor can perform the above tasks on a continuous basis and provide threat warning in a timely manner.

Illustrative apparatus associated with the execution of various illustrative methods includes a spectral analysis system. The spectral analysis system includes a data processing system, an imaging-sensor array or "imager," and an optical system. The data processing system includes a central processor and at least one memory device communicatively linked to the processor. The imaging-sensor array is adapted to detect wavelengths over a predetermined range of electromagnetic wavelengths and is communicatively linked to the data processing system. An illustrative optical system includes a focusing element and is configured for imaging a dispersion pattern of electromagnetic energy emitted from a source event external to the optical system onto the imaging-sensor array. The optical system is furthermore characterized at least in part by a set of attributed pre-contrived electromagnetic-energy dispersion patterns including at least one dispersion signature correlating a source-event location, within a predetermined field of view, with impingement positions upon the imaging-sensor array of a plurality of dispersed wavelengths within the sensitivity range of the imaging-sensor array. The optical system includes a selected set of optical dispersion apparatus including a first set of optically dispersive elements that disperses a first selected set of wavelengths within the sensitivity range of the imaging-sensor array and a second set of optically dispersive elements that disperses a second selected set of wavelengths within the sensitivity range of the imaging-sensor array such that wavelengths emitted from an emitting source event that are within the first and second selected sets of wavelengths impinge simultaneously upon the imaging-sensor array along, respectively, a first extrapolated axis and a second extrapolated axis that is non-parallel to the first extrapolated axis, wherein the optical system is calibrated, and the first and second wavelength sets selected, such that each predetermined combustion event of interest emits wavelengths within each of the first and second wavelengths sets, thereby resulting in a dispersion pattern upon the imaging-sensor array that at least partially extends along each of two non-parallel extrapolated axes.

In various implementations, the imaging-sensor array is a focal plane array (FPA) with associated mechanical, thermal and electrical support. The broad spectral band required for most embodiments leads to broad spectral requirements for all of the system components, specifically the FPA, the focusing element (e.g. a lens) and the optical dispersion apparatus. In practice, this eliminates diffraction gratings from consideration as the optical dispersion apparatus and leaves prisms as the optimal choice. Broadband FPAs are typically based on InSb-detector technology. FPAs that cover the 0.4-5.5 um spectral range are widely available. In an alternate embodiment, the imaging sensor and the system operate over the 1.1-5.5 um spectral band, for which an even larger selection of FPAs is available.

Like the imaging-sensor, the focusing element must be functional over a large spectral range. In one embodiment, a lens is implemented as a reflective system that does not suffer from chromatic aberration. In and alternate embodiment, a lens is implemented as a refractive system. While a refractive lens facilitates a more compact design with a larger field of view, such lenses are accompanied by non-negligible chromatic aberration. Many glasses transmit light over the required spectral range including $BaF_2$, $CaF_2$, $MgF_2$, ZnS, ZnSe, and Sapphire.

The dispersion apparatus of one illustrative embodiment is a Crossed Dispersion Prism (CDP). In general, a CDP need only consist of two complementary prism elements. The optically dispersive prism elements are complementary in the sense that the glasses used are dispersive in complementary regions of the sensor's spectral band. A crossed dispersion prism can be fabricated from glasses exhibiting the aforementioned dispersion characteristics by forming each glass element into a prism, then aligning the prisms so that the dispersion directions are orthogonal. In alternate embodiments, three or four prism elements can be used to control the beam deviation and to control the anamorphic magnification introduced by the prisms.

The event signature that results, and is projected onto the imaging-sensor array, from such an arrangement resembles a chevron, wherein short wavelengths are mapped toward the end of one arm of the chevron and long wavelengths are mapped toward the end of the other arm. Intermediate wavelengths are uniquely mapped to points on the chevron between the two ends.

Associated with the spectral analysis system for the execution of various implementations are programmed signal processing algorithms. The signal processing is tuned to the combination of the spectral signatures of interest and the effects of the optical system and the imaging-sensor array of spectral signatures transmitted and processed thereby. In one illustrative implementation, the signal processing chain is designed as a multi-layer sieve wherein the "top layers" discard irrelevant data and the "lower layers" extract information from the remaining data. The amount of data a given layer processes decreases and the complexity of the computation increases for the deeper (lower) layers, such that computationally intensive operations are performed only on data likely to contain data indicative of events of interest, thereby reducing processing time and conserving computing resources.

Within an illustrative signal processing chain, a detection layer processes all of the spectral data registered at the imaging-sensor array with a very simple and efficient algorithm. Data frames that are likely to contain event signatures are regarded as candidate-event-containing quasi-image-data frames and passed on for processing by a subsequent processing algorithm, where the event location is determined (or at least approximated) and the spectrum signature is extracted. If an event is not detected by the detection algorithm, or the location of a candidate event cannot be determined, then the processing increments to the next frame and performs analogous operations thereon. Otherwise, the extracted spectrum is then checked for consistency with prominent atmospheric features, and inconsistent spectra are rejected. Consistent spectra are then compared to ongoing tracks. If the spectra are in close proximity to those of an ongoing track, then the ongoing track is augmented with the new signature. If a new spectrum is not in close proximity to an ongoing track, then a new track is started. The resulting event signature is then eliminated from the data frame and the data is checked for additional events.

Because the detection algorithm processes all the data from every frame, it must be capable of processing the sensor output at the sensor data rate in order to obviate a processing bottleneck. Accordingly, in a typical implementation, the detection algorithm is simple. The detection algorithm is also required to reduce the data bandwidth sufficiently to enable the more computationally-intensive location and extraction algorithm to process all of the data passed to it.

In a typical implementation, event detection is initiated by subtracting data frames that are separated by a finite delay. More specifically, the spectral analysis system is caused to monitor a predetermined field of view by registering at the imaging-sensor array, and storing in computer memory, at least two quasi-image-data frames temporally separated from one another by a predetermined time interval. Each quasi-image-data frame has associated therewith data representing a scene within the field of view over a predetermined set of wavelengths. A first quasi-image-data frame is algorithmically subtracted from a temporally-separated second quasi-image-data frame to yield a difference-data set representative of the difference in energy intensity between the first and second quasi-image-data frames at each wavelength of a selected plurality of wavelengths. The delay can be implemented as a First In First Out (FIFO) buffer or as a ring buffer.

An algorithmic detection filter that analyzes the difference-data set is executed and declares the presence within the predetermined field of view of an event of interest and, thereby, the presence of image data representative of the event of interest in one of the first and second quasi-image-data frames, when a predetermined threshold filter value is exceeded, and regards the quasi-image-data frame that is declared to contain data representative of the event of interest as a candidate-event-containing quasi-image-data frame, the candidate-event-containing quasi-image-data frame having associated therewith in computer memory a registered-dispersion-pattern data set. In one illustrative implementation, the difference-data set is passed through (e.g., analyzed by) an Infinite Impulse Response (IIR) filter. For 1-dimensional data, the IIR filter is given by $$h_{i+1} = \alpha h_i + (1-\alpha) d_{i+1}, \quad (1)$$

where $d_i$ are the data, $h_i$ is the IIR filter output and $\alpha$ is a constant between 0 and 1. In various implementations, $\alpha$ is chosen so that the multiplications can be implemented as bit-shift operations. For example, both multiplications can be implemented as a single bit shift to the right if $\alpha$ is ½.

In one embodiment, the IIR filter is used to integrate along the MWIR arm of an event signature; that is, the arm of the chevron along which data points representing the impingement positions, upon the imaging-sensor array, of wavelengths in the mid-wave infrared extend. In a particularly advantageous implementation, the chevron arms are aligned as close to 45 degrees as practicable relative to the rows and columns of detector sites on the imaging-sensor array. Accordingly, in such an implementation, the indexing of the 2-D IIR filter on diagonals is modified from the 1-D example of Eq. 1. In this case the IIR filter integrates along the northeast south-west diagonal, for example. In a typical embodiment, the memory equivalent of one row of the quasi image is required. Alternative implementations of the IIR filter for various orientations of the prism are straight forward extensions of the preferred embodiment and are, therefore, with the scope and contemplation of the invention as claimed.

As previously stated, events or, more typically, candidate events are declared to be present in association with a quasi-image-data frame when the IIR filter exceeds a predetermined threshold value. In various versions, the threshold value is constantly adjusted to maintain a constant detection rate, which is equivalent to a constant false alarm rate when the probability of an event is small. The optimal detection rate depends on the signal processing implementation and on the hardware used.

Relative to a candidate-event-containing quasi-image-date frame, a spectral analysis algorithm is executed. In alternative versions, the spectral analysis algorithm is one of (i) an event-locating algorithm, (ii) an event identifying and/or characterizing algorithm, and (iii) both and an event-locating and an event identifying and/or characterizing algorithm. In one implementation, the spectral analysis algorithm consults the dispersion-pattern data set associated with the selected set of optical dispersion apparatus and matches and co-orientates as closely as practicable a pre-contrived electromagnetic-energy dispersion pattern with the registered-dispersion-pattern data set in order to approximate, with reference to the source-event location correlated with the matched and co-oriented pre-contrived electromagnetic-energy dispersion pattern, the location within the predetermined field of view of the object source event that emitted the electromagnetic energy from which the registered dispersion pattern was produced. In other words, in a typical implementation, location estimation involves fitting a template to the measured signature data.

In various versions, location estimation is a two-step process in which a first step provides a coarse estimate of the location, which is accurate to the nearest pixel, and a second step uses the coarse estimate to form a more accurate estimate. In one implementation, the coarse location estimate is implemented as a correlation of the form $$c_{m,n} = \sum_i \sum_j d_{i,j} t_{i-m,j-n}, \quad (2)$$

where c is the correlation and t is a template obtained from an instrument calibration. Equation 2 is often expressed in abbreviated form $$c = d \star t, \quad (3)$$

where the ★ indicates correlation. The pixel with the largest signal level (e.g., greatest intensity) yields the event location relative to the template location. In various implementations, the correlation is implemented as a Fourier transform. Each candidate frame (i.e., candidate-event-containing quasi-image-data frame) is Fourier transformed, multiplied by the archived template transform and inverse Fourier transformed. The brightest pixel in the resulting correlation image gives the event location to the nearest pixel.

Once the cross correlation yields an estimate of the event location, a more accurate estimate can be obtained by calculating where first and second non-parallel extrapolated axes fit to the two arms of the chevron cross. In the preferred embodiment the coarse location estimate is used to define two boxes. Lines are fit to the pixel values within the boxes and extrapolated, and the point where the lines cross provides a refined estimate of the event location.

Once the location of the source event is determined, spectral signature extraction can be accomplished. The signature extraction processing analyzes the difference-frame image (e.g., difference-data set), which is free of scene clutter and imaging-sensor non-uniformities. The extraction algorithm inverts the spatial-spectral mixing introduced by the prism. In the preferred embodiment the functionality of the prism is described by a system transfer function matrix, and an algorithm for inverting the prism functionality is implemented as an inversion of the system transfer function matrix. Aspects of the spectral signature extraction are more completely described in the detailed description.

Representative implementations are more completely described in the following detailed description, the elucidation of which is facilitated by the schematic representations of, and numerical and graphical data relating to, an illustrative embodiment contained in the accompanying drawings.

BRIEF DESCRIPTION OF THE DRAWINGS

FIG. 2A schematically depicts the architecture of an alternative illustrative spectral analysis system in association with which implementations of the invention are executed;

DETAILED DESCRIPTION

The following description of apparatus for and methods of analyzing the spectral signature of a dynamic combustion event is illustrative in nature and is therefore not intended to limit the scope of the invention or its application of uses.

Figure 1:
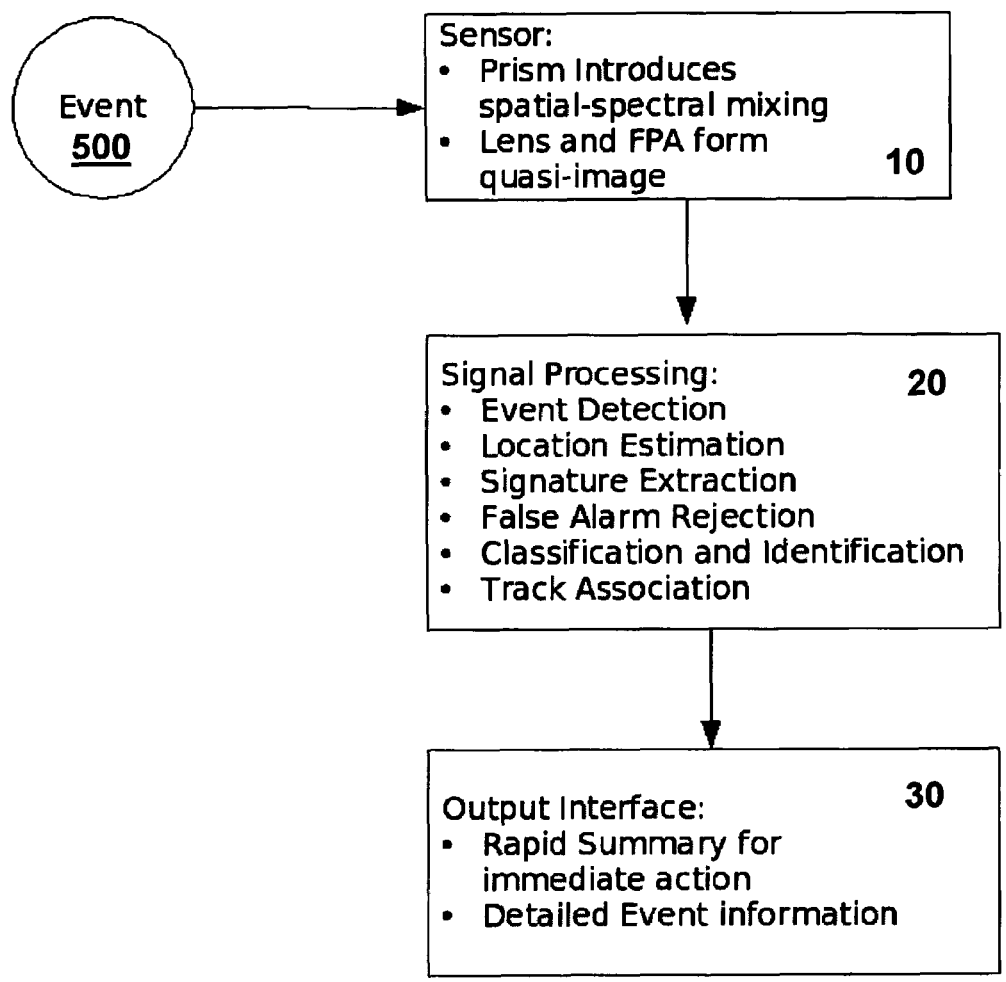
FIG. 1 shows a "broad view" schematic representing an illustrative implementation of the invention.

A "broad view" schematic representing a typical implementation is shown in FIG. 1. Block 10 represents apparatus configured to acquire, register and store data representative of the energy emitted from a combustion event 500 and to create, from that data, a quasi-image or, more specifically, a series of quasi-image-data frames. Block 20 represents the various algorithmic signal processing steps including event detection, location estimation, signature extraction, false alarm rejection, classification and identification, and track association. The signal processing is tuned to the combination of the spectral signatures of interest and the effect of the sensor and optical elements. The output interface block 30 represents the communication link between the operative apparatus and the user, which may feed the output into additional processing or automated countermeasures.

Figure 2:
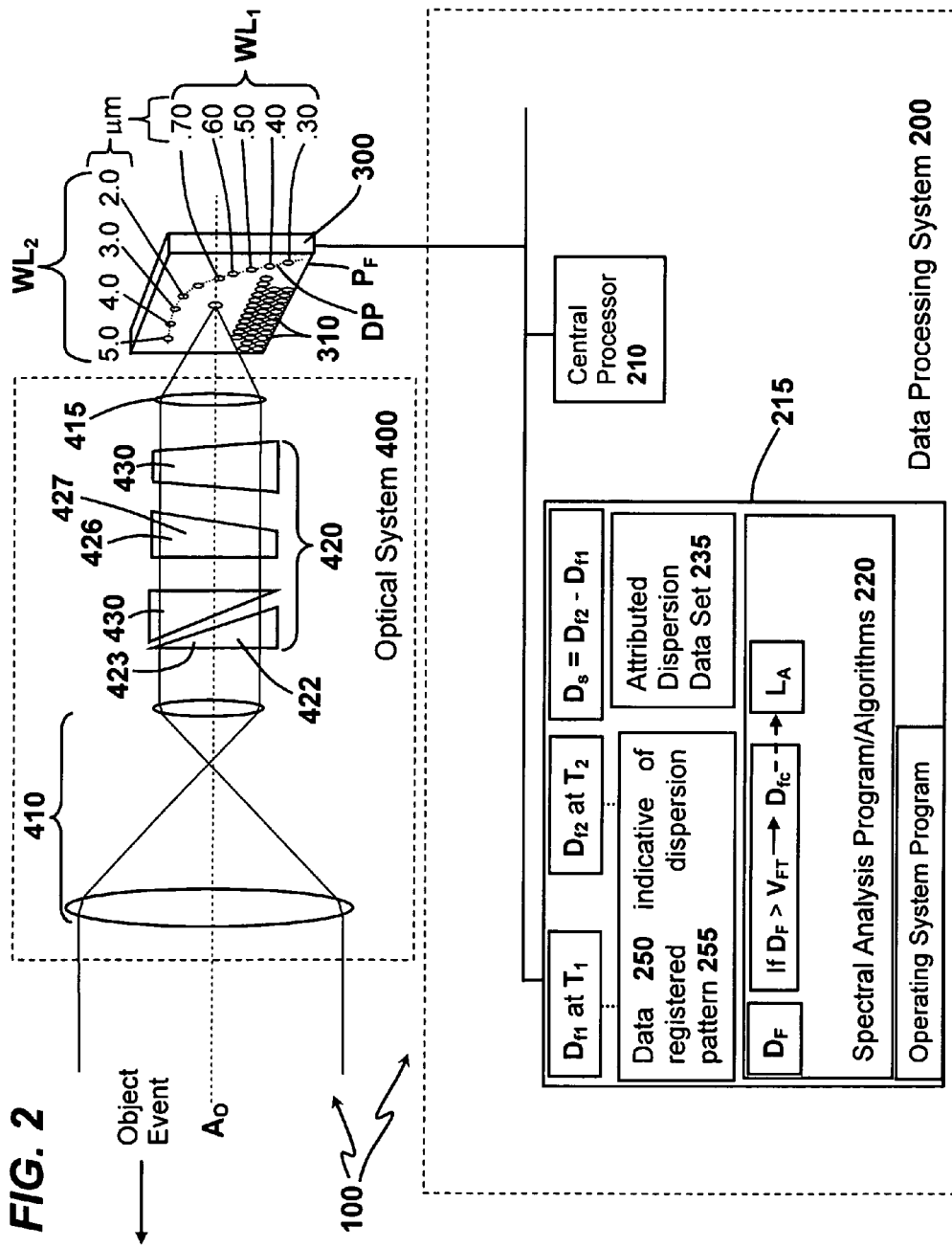
FIG. 2 schematically depicts the architecture of an illustrative spectral analysis system in association with which implementations of the invention are executed.

Referring to FIG. 2, the architecture of an illustrative spectral analysis system 100 is schematically represented and includes (i) a data processing system 200; (ii) an imaging-sensor array 300 communicatively linked to the data processing system 200 and (iii) an optical system 400 adapted for imaging electromagnetic energy emitted from an object source event (not shown) external to the optical system 400 onto the imaging-sensor array 300.

The data processing system includes a central processor 210 and a memory 215 and is programmed to execute spectral analysis algorithms 220 as described in more detail further in this description. Alternative implementations incorporate any of a variety of conventional imaging sensor arrays 300 adapted to detect wavelengths over a predetermined range of electromagnetic wavelengths. An illustrative non-limiting example of an imaging-sensor array 300 suitable to the illustrative implementation under consideration includes arrayed detectors 310 comprising indium antimonide (InSb), which are responsive to wavelengths of light ranging approximately from 0.40 μm through 5.5 μm.

The optical system 400 schematically represented in the illustrative implementation of FIG. 2 includes a telescope 410 optically aligned with a set of optical dispersion apparatus 420. Located between the set of optical dispersion apparatus 420 and the imaging sensor array 300 is a lens 415 situated such that the imaging sensor array 300 corresponds in location to the focal plane $P_F$ of the lens 415. The ray trace lines in the schematic of FIG. 2 represent the paths of illustrative light rays in the absence of the set of optical dispersion apparatus 420.

Figure 3:
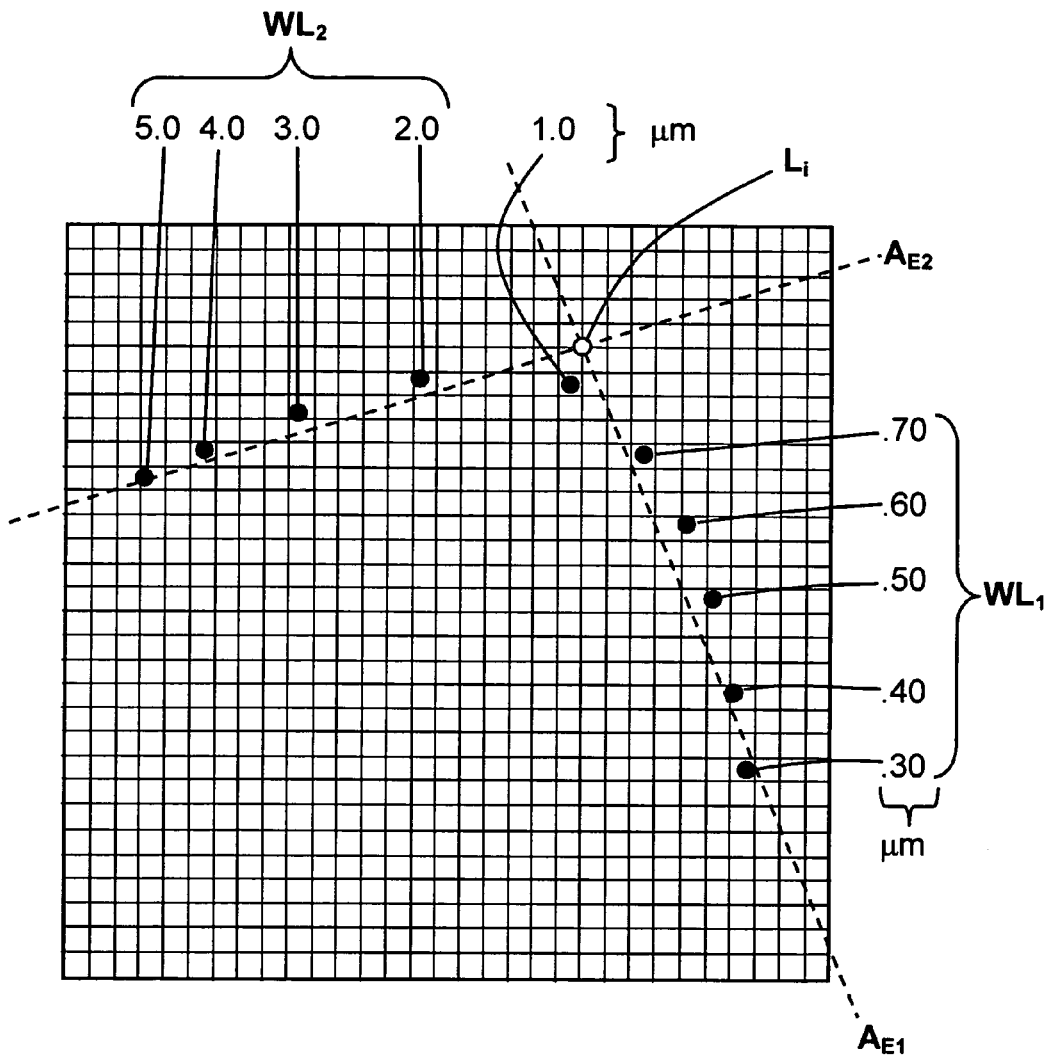
FIG. 3 represents dispersed electromagnetic wavelengths as registered by the imaging sensor array of a spectral analysis system.

Referring to FIGS. 2 and 3, the optical dispersion apparatus set 420 in the particular version of FIG. 2 includes a first optically dispersive element 422 that disperses a first selected set of wavelengths $WL_1$ within the sensitivity range of the imaging-sensor array 300 generally along a first extrapolated axis $A_{E1}$ extending along the focal plane $P_F$ and a second optically dispersive element 426 that disperses a second selected set of wavelengths $WL_2$ within the sensitivity range of the imaging-sensor array 300 generally along a second extrapolated axis $A_{E2}$ extending along the focal plane $P_F$ in a direction that is non-parallel to the first extrapolated axis $A_{E1}$. The optically dispersive elements 422 and 426 are selected such that the first optically dispersive element 422 is less dispersive of the second set of wavelengths $WL_2$ than of the first set of wavelengths $WL_1$ and the second optically dispersive element 426 is less dispersive of the first set of wavelengths $WL_1$ than of the second set of wavelengths $WL_2$. Moreover, as will be readily appreciated by reference to FIG. 2, the optical dispersion apparatus set 420 is configured such that the impingement upon the focal plane $P_F$ of first and second selected sets of wavelengths $WL_1$ and $WL_2$ along, respectively, first and second extrapolated axes $A_{E1}$ and $A_{E2}$ is simultaneous. Although constituent wavelengths within each of the first and second selected sets of wavelengths $WL_1$ and $WL_2$ are caused to impinge simultaneously upon the focal plane $P_F$, it will be appreciated that, in the particular illustrative version of FIG. 2, the dispersion of wavelengths within each of first and second selected sets of wavelengths $WL_1$ and $WL_2$ may be regarded as "sequential" or "serial." That is, most of the dispersion of wavelengths within the first wavelength set $WL_1$ results when the light emitted from the object event passes through the first optically dispersive element 422, while most of the dispersion of wavelengths within the second wavelength set $WL_2$ results when the light emitted from the object event, including the wavelengths within the first wavelength set $WL_1$, passes, at a later time, through the second optically dispersive element 426. For purposes of this specification and the appended claims, optically dispersive elements 422 and 426 exhibiting the aforementioned relative dispersion characteristics are referred to as "dispersively complementary" or, interchangeably, "complementary."

Each of the extrapolated axes $A_{E1}$ and $A_{E2}$, in various implementations, represents one of (i) a line that is "best fitted" to a selected set of points or locations along the focal plane $P_F$ at which the various constituent wavelengths within the corresponding one of the selected wavelength sets (i.e., $WL_1$ or $WL_2$) impinges upon the focal plane $P_F$ and (ii) a line parallel to such a "best fit" line. Referring to the graphically represented dispersion pattern of FIG. 3, which represents the simultaneous impingement locations of selected wavelengths registered by the imaging sensor array 300 of FIG. 2, the dispersion pattern DP traces an arcuate path having two "arms" resembling a "chevron" extending away from what can fairly be regarded as an inflection point corresponding to 1.0 μm. In this example, the first extrapolated axis $A_{E1}$ is fitted to the wavelengths between and including 1.0 μm and 5.0 μm and the second extrapolated axis $A_{E2}$ is fitted to the wavelengths between and including 0.30 μm and 1.0 μm. It will be appreciated, at least upon further reading of the specification, that the location approximating aspects of various implementations improve as the first and second extrapolated axes $A_{E1}$ and $A_{E2}$ approach orthogonality; correlatively, a relatively flat arcuate dispersion pattern—or another dispersion pattern in which the extrapolated axes $A_{E1}$ and $A_{E2}$ are close to parallel or collinear—is disadvantageous to the task of estimating the non-dispersed image location in those implementations that reference a non-dispersed image location, a concept that is discussed in greater detail below. Moreover, alternative aspects that do not reference a non-dispersed image location may still, or instead, reference an intersection location $L_i$ at which the first and second extrapolated axes $A_{E1}$ and $A_{E2}$ cross or "intersect." It will be appreciated relative to these latter implementations that parallel or collinear first and second extrapolated axes $A_{E1}$ and $A_{E2}$ do not "cross" and, therefore, would yield no "intersection location $L_i$" to be used as a locating reference. Accordingly, the first and second dispersive elements 422 and 426 of various embodiments should be chosen and oriented so as to disperse the first and second wavelength sets $WL_1$ and $WL_2$ along first and second extrapolated axes $A_{E1}$ and $A_{E2}$ that are at least non-parallel and, preferably, as close to orthogonal as practicable.

Although the specific illustrative examples described in detail herein and depicted in the drawings suggest that each of the first and second wavelength sets $WL_1$ and $WL_2$ includes only wavelengths that are not within the compass of the other wavelength set, it should be understood that this is not the case for all envisioned implementations regarded as within the scope the invention. In other words, the wavelengths included in each of the selected first and second wavelength sets $WL_1$ and $WL_2$ can, in alternative embodiments, be entirely distinct from the wavelengths in the other wavelength set, partially overlapping with wavelengths in the other set or entirely overlapping with wavelengths in the other set. An example of an arrangement in which the first and second wavelength sets $WL_1$ and $WL_2$ overlap entirely (i.e., include identical wavelengths of interest) includes first and second dispersive elements 422 and 426 adapted to disperse the same wavelengths oriented such that they disperse the wavelengths in different directions along the focal plane $P_F$ such that, for instance, extrapolated axes $A_{E1}$ and $A_{E2}$ fitted to the resulting dispersion pattern DP cross. It will be appreciated that a case in which the first and second wavelength sets $WL_1$ and $WL_2$ are entirely overlapped may represent an exception to the approach of selecting the optically dispersive elements 422 and 426 such that the first optically dispersive element 422 is less dispersive of the second set of wavelengths $WL_2$ than of the first set of wavelengths $WL_1$ and the second optically dispersive element 426 is less dispersive of the first set of wavelengths $WL_1$ than of the second set of wavelengths $WL_2$. However, this is not necessarily the case as one of dispersive elements 422 and 426 may be adapted to disperse the same wavelengths more dramatically than the other of dispersive elements 422 and 426.

Figure 4:
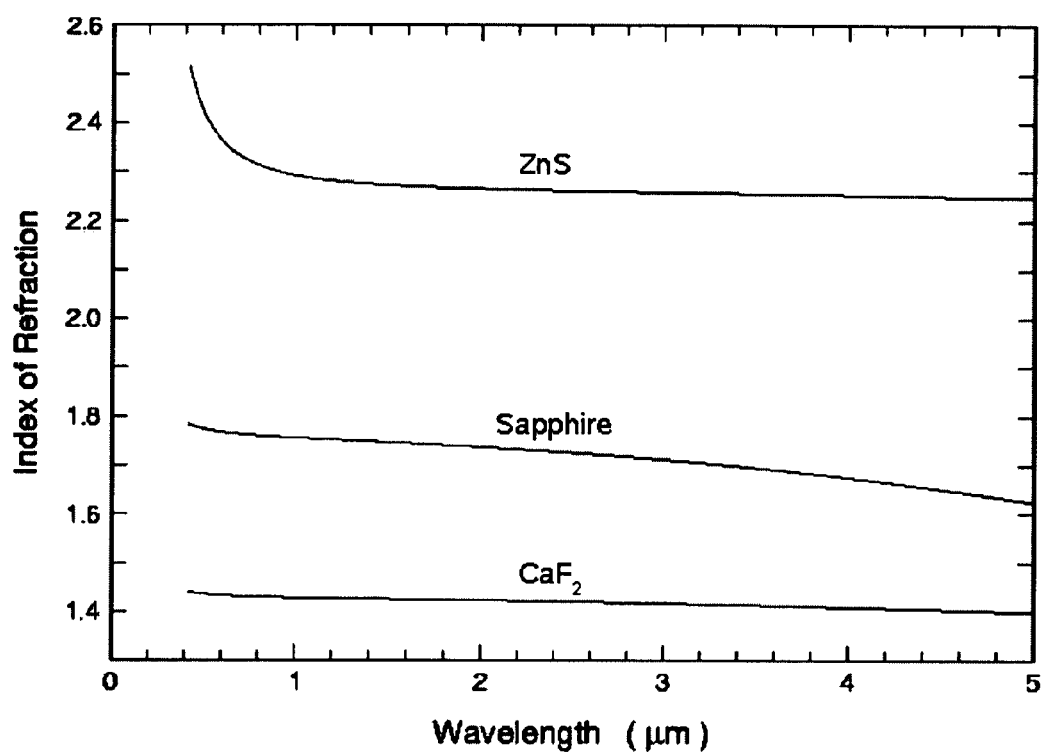
FIG. 4 is a graph of index of refraction versus wavelengths for zinc sulfide, sapphire and calcium fluoride.

In the illustrative embodiment of FIG. 2, the first and second dispersive elements 422 and 426 are first and second prisms 423 and 427 adapted to disperse most significantly in and through, respectively, a first visible range (i.e., about 0.40 µm through 0.80 µm) and a second short to medium wave infrared range (i.e., about 2.0 µm to 5.0 µm). An advantageous material from which to fabricate the first prism 423 is zinc sulfide (ZnS)—which actually becomes non-transmissive below about 0.42 µm—because ZnS is sharply dispersive within the prescribed visible range and relatively non-dispersive in the second illustrative wavelength range $WL_2$ (i.e., about 2.0 µm to 5.0 µm). Complementarily, sapphire ($Al_2O_3$) is an advantageous choice for the second prism 427 because it is substantially more dispersive in the 2.0 µm to 5.0 µm range than within the range of 0.40 µm through 0.80 µm, for example. The indices of refraction versus wavelength for ZnS and sapphire are graphically depicted in FIG. 4. Although ZnS and sapphire are suggested herein as particularly advantageous for the illustrative prescribed wavelength ranges, both the wavelength ranges and these materials are regarded as illustrative, non-limiting examples. Accordingly, other materials may be suitable for the particular wavelength ranges prescribed above and, depending on the spectral analysis desired in alternative applications, altogether different wavelength ranges and correspondingly suitable materials may be selected.

Experimentation has revealed that arrangements involving two or more prismatic dispersion elements result in angular deviation of the optical axis $A_O$. Although the various components of the system 100 can be oriented to compensate for this deviation, the mechanical assembly is typically simplified by the introduction of at least one "corrective" optical element 430 to redirect the optical axis $A_O$. Ideally, the index of refraction of a corrective optical element 430 is constant as a function of wavelength. However, because, in practice, there are no optically transmissive materials for which the refractive index does not vary, however little, with wavelength, a material is chosen that exhibits as constant a refractive index as practicable over the wavelength ranges of interest. For instance, as shown in the refractive index versus wavelength graph of FIG. 4, the refractive index of calcium fluoride ($CaF_2$) is relatively constant over the illustrative first and second wavelength sets $WL_1$ and $WL_2$ extending through and between 0.40 µm and 5.0 µm. In the particular embodiment schematically depicted in FIG. 2, a corrective element 430 is present following each of the first and second prisms 423 and 427. Arrangements employing a single corrective element 430 following both prisms 423 and 427 in the optical train are feasible and within the scope and contemplation of the invention, but have proven substantially more difficult to fabricate.

Alternative dispersion apparatus 420 may, in various embodiments, be used in place of prisms 423 and 427 as optically dispersive elements 422 and 426. For example, as shown in FIG. 2A, diffraction gratings 424 and 428 serve as first and second optically dispersive elements 422 and 426. The diffraction gratings 424 and 428 in this particular illustrative arrangement are incorporated into a unitary grating structure 429. Although the particular implementation of FIG. 2A does not include a corrective element 430, it will be appreciated that one or more optically corrective elements 430 may be advantageous in alternative implementations incorporating one or more gratings. Moreover, in actual practice, an arrangement of gratings 424 and 428 such as that shown in FIG. 2A would typically yield, in the absence of some "correction," a +-shaped dispersion pattern DP rather than the L-shaped dispersion pattern DP depicted for clarity in the illustration. As a point of conceptual distinction between the arrangements of FIGS. 2 and 2A, if the prisms 423 and 427 in the arrangement of FIG. 2 cause dispersion that is regarded as "serial" or "sequential," as previously explained, then it is fair and reasonable to regard the dispersion of the first and second wavelength sets $WL_1$ and $WL_2$ caused by the gratings 424 and 428 in the illustrative arrangement of FIG. 2A as "simultaneous."

In still additional alternative embodiments, "hybrid" devices known as "GRISMs" having both diffractive and refractive properties are used to disperse the wavelengths of interest. Moreover, some GRISM configurations include optical-axis correcting properties and obviate the need for a separate corrective element such as 430. It will be appreciated that the particular dispersive apparatus selected for incorporation in any particular embodiment is of no particular consequence so long as the selected apparatus disperse the wavelengths of interest in accordance with parameters appropriate to the particular application and so long as the selected dispersive apparatus project upon the focal plane a dispersion pattern that extends generally along two non-parallel extrapolated axes simultaneously. Prisms, gratings and GRISMs are suggested herein only by way of non-limiting example and, furthermore, it is generally immaterial to the intended functions of the invention whether a particular embodiment incorporates an optical dispersion apparatus set 420 that disperses first and second wavelength sets $WL_1$ and $WL_2$ sequentially or simultaneously, as described in conjunction with the illustrative versions of, respectively, FIGS. 2 and 2A. Accordingly, the available combinations and arrangements of dispersive, corrective and focusing elements suitable to any of various applications, and within the scope of the invention as set forth in the appended claims, are limited only by the collective capacity of human ingenuity to devise them.

In various embodiments implementing either a grism or a grating as an optically dispersive element, it is advantageous to filter the grism or grating such that it passes only the wavelengths that element is intended to disperse. For instance, in an arrangement such as that of FIG. 2A, if the diffraction grating 424 is adapted to disperse light in the visible range and the diffraction grating 428 is adapted to disperse light in the infrared range, the diffraction grating 424 is filtered at least to the extent that it does not pass infrared light and the diffraction grating 428 is filter at least to the extent that it does not pass visible light.

Figure 7:
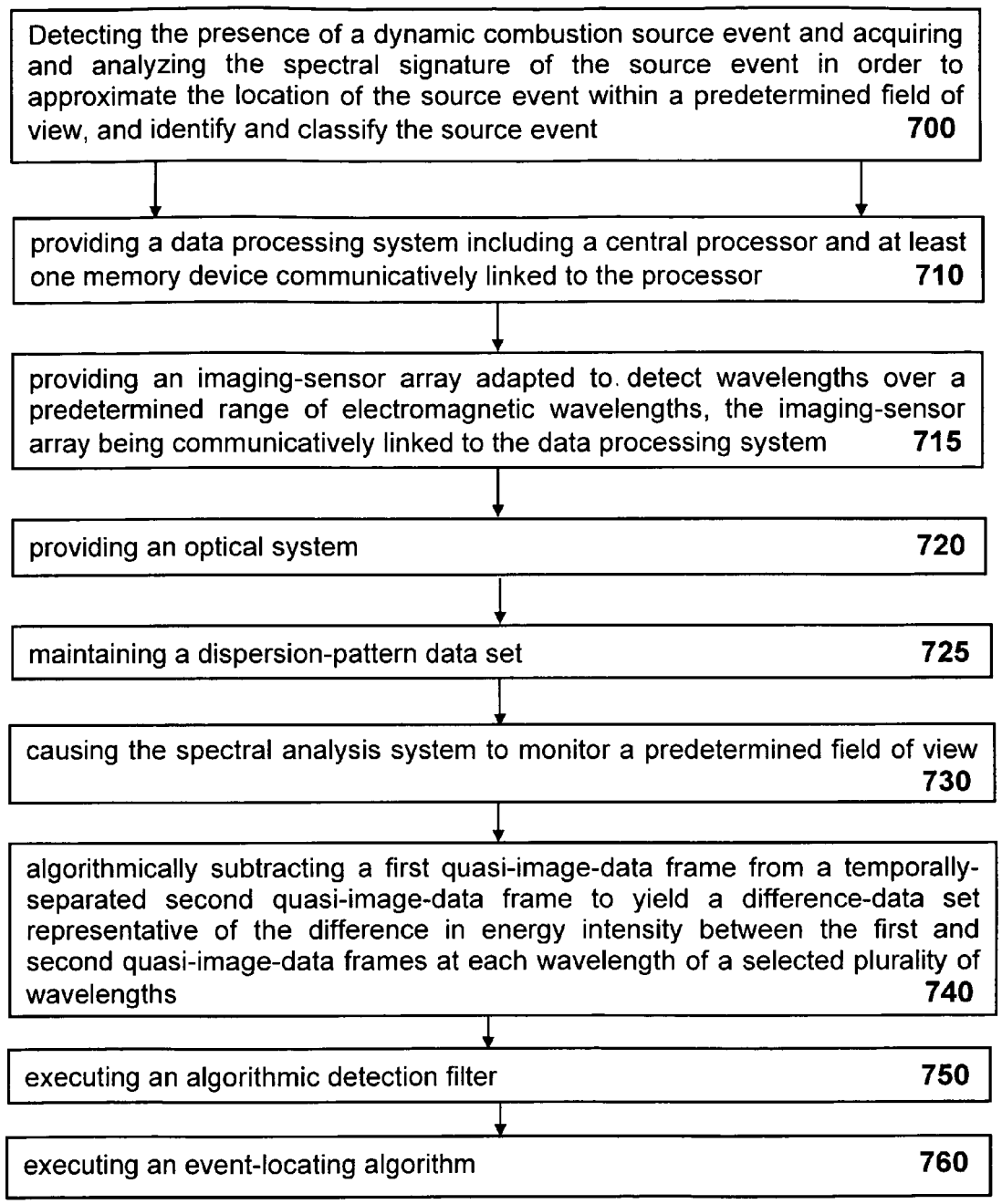
FIG. 7 depicts steps in an illustrative method of detecting and analyzing the spectral signature of a combustion source event in order to approximate the location of the event within a predetermined field of view, and identify and classify the event.

In conjunction with FIGS. 2 through 7, an illustrative method of detecting a dynamic combustion source event of interest and analyzing the spectral signature of the source event in order to approximate the location of the event within a predetermined field of view, and identify and classify the source event, is now described. Referring to FIG. 7, a sequence of method steps illustrates a method of detecting and approximating the location of a combustion event. It should be noted that the sequence of steps presented in the drawing and the text to follow is illustrative only and not necessarily indicative of the order in which the steps must be performed. Accordingly, nothing in the drawings, this description or the corresponding claims should be construed so as to limit the scope of the invention to a particular sequence of steps in the absence of explicit statements to the contrary or unless a particular order is inextricably dictated by context (e.g., an instance in which it is impossible to perform a particular step prior to the performance of another step.). Moreover, although the particular apparatus used to execute method aspects is not relevant, reference is made to the illustrative apparatus of FIG. 2 in order to facilitate comprehension of the method.

The illustrative method 700 presented in FIG. 7 includes a step 710 of providing a data processing system 200 including a central processor 210 and at least one memory device 215 communicatively linked to the processor.

At 715, an imaging-sensor array 300 adapted to detect wavelengths over a predetermined range of electromagnetic wavelengths in provided. The imaging-sensor array 300 is communicatively linked to the data processing system 200 in an operative manner that facilitates processing by the data processing system 200 of spectral data registered at the imaging sensor array 300.

Step 720 prescribes providing an optical system 400 adapted for imaging electromagnetic energy emitted from a source event external to the optical system 400 onto the imaging-sensor array 300. The optical system 400 includes a selected set of optical dispersion apparatus 420 and a focusing element (e.g., a lens 415) situated between the dispersion apparatus 420 and the imaging-sensor array 300 such that the imaging-sensor array 300 corresponds in location to the focal plane $P_F$ of the focusing element. The set of optical dispersion apparatus 420 is characterized at least in part by a set of attributed pre-contrived electromagnetic-energy dispersion patterns 230 (see, for example, FIG. 5A) including at least one dispersion signature correlating, in this particular illustrative case, a non-dispersed image location NDIL along the focal plane $P_F$ with impingement positions upon the focal plane $P_F$ of a plurality of dispersed wavelengths within the sensitivity range of the imaging-sensor array 300. The non-dispersed image location NDIL is indicative of where, relative to the impingement positions of the dispersed wavelengths, the polychromatic image of an object event located at a predetermined position within a predetermined field of view would be located along the focal plane $P_F$ in the absence of the optical dispersion apparatus 420 and, therefore, serves as a basis for estimating the location of an emitting source event. In other words, as previously discussed in the summary, a non-dispersed image location NDIL is a reference used to achieve the more general objective of correlating a source-event location, within a predetermined field of view, with impingement positions upon the focal plane $P_F$ of a plurality of dispersed wavelengths within the sensitivity range of the imaging-sensor array 300.

As previously described, the location of a source event within a predetermined field of view may be correlated to impingement positions upon the focal plane $P_F$ of a plurality of dispersed wavelengths by referencing one or more points, other than or in addition to a non-dispersed image location NDIL, along the focal plane $P_F$. A logical point of reference used in various alternative implementations, and previously described in association with FIG. 3, is the intersection location $L_i$ indicative of where first and second extrapolated axes $A_{E1}$ and $A_{E2}$ associated with, for example, an arcuate, chevron-shaped dispersion pattern intersect. Even in some implementations in which a non-dispersed image location NDIL is referenced, the intersection location $L_i$ is also referenced because it can be used to locate the non-dispersed image location NDIL and/or, in conjunction with the non-dispersed image location NDIL, facilitate positioning and orientating of a pre-contrived electromagnetic-energy dispersion pattern 230 "over" data indicative of a registered dispersion pattern in a manner that will be more fully appreciated upon complete review of the detailed description.

Figure 5A:
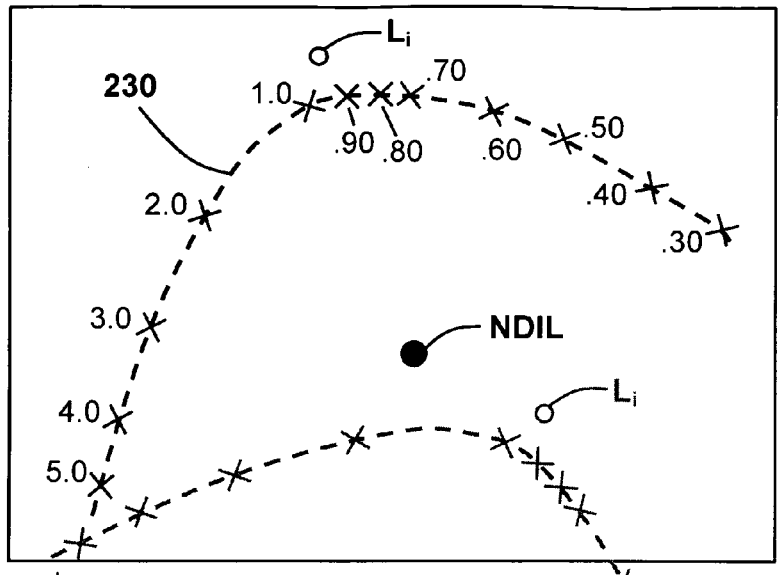
FIG. 5A is a graphical representation of pre-stored data indicative of an attributed pre-contrived electromagnetic-energy dispersion pattern associated with an illustrative set of optical dispersion apparatus.
Figure 5B:
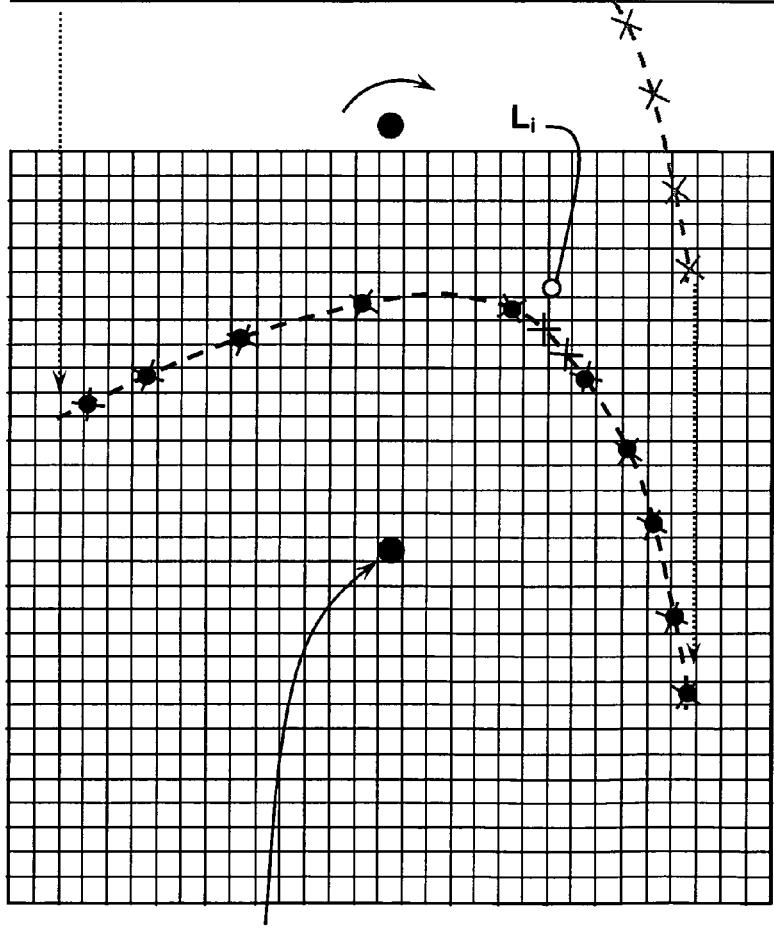
FIG. 5B is graphical representation of the data represented in FIG. 4A being fitted to an illustrative set of dispersed electromagnetic wavelengths as registered by the imaging sensor array of a spectral analysis system.
Figures 6A, 6B:
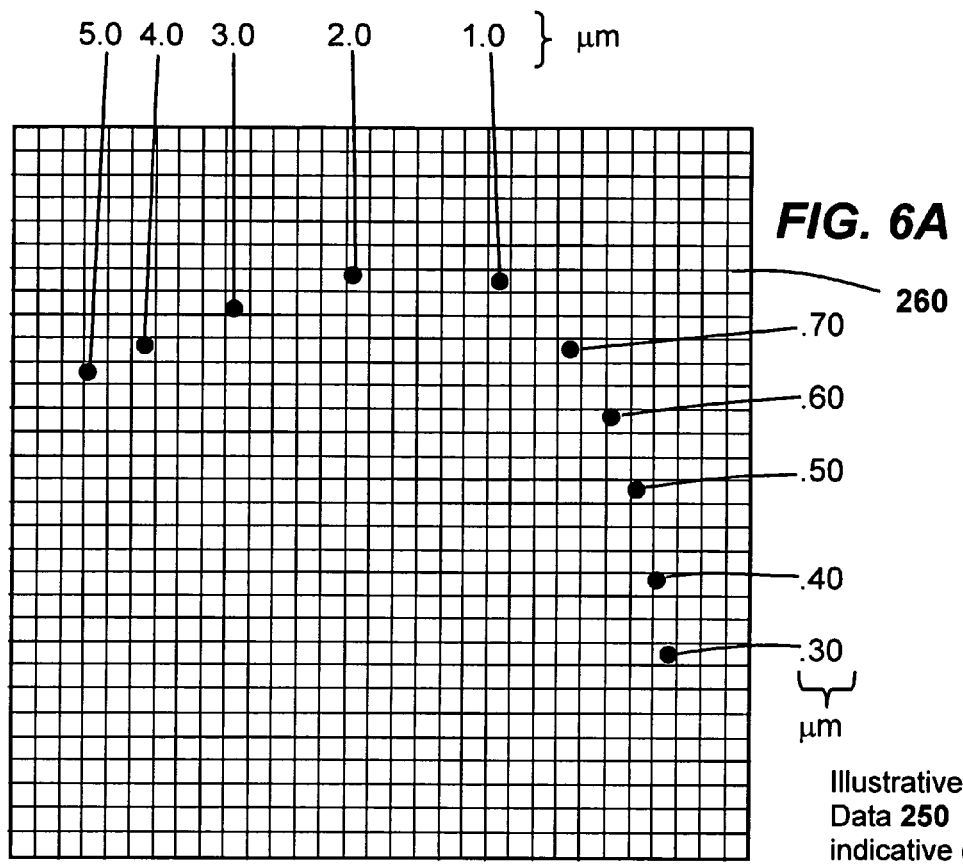
FIG. 6A depicts an impingement-point map representing data indicative of a dispersion pattern registered by the imaging-sensor array of spectral analysis system.
FIG. 6B includes tabulated numerical impingement-point address values of various wavelengths depicted graphically in FIG. 5A and numerical relative intensity data for the represented wavelengths.

Step 725 indicates the maintenance (e.g., in computer memory 215) of an attributed dispersion-pattern data set 235 associating the selected set of optical dispersion apparatus 420 or, more generally, the optical system 400 and the spectral analysis system 100, with data indicative of the set of pre-contrived electromagnetic-energy dispersion patterns 230. FIG. 5A graphically represents data in a pre-stored dispersion-pattern data set 235 (shown in FIG. 2) including data indicative of a pre-contrived electromagnetic-energy dispersion pattern 230 associated with the set of optical dispersion apparatus 420. Referring to the illustrative pre-stored dispersion signature of FIG. 5A, the non-dispersed image location NDIL is positionally related to a selected plurality of dispersed-wavelength impingement positions as indicated by the X's along the fitted curvilinear path. The non-dispersed image location NDIL is, for instance, an arbitrary location at which the optical system 400 would image a distant object event along the focal plane $P_F$ in the absence of the selected set of optical dispersion apparatus 420. The dispersed wavelength impingement positions represent where, along the focal plane $P_F$, the optical system 400 causes the various selected wavelengths to impinge relative to the non-dispersed image location NDIL with the selected set of optical dispersion apparatus 420 in place. As indicated in the summary, for the purposes of creating the attributed dispersion-pattern data set 235 for a particular optical system 400, the relative positions of the dispersed-wavelength impingement positions and the non-dispersed image location NDIL can be established by theoretical calculation, experimentation or by a combination of theoretical calculation and experimentation. Also shown in FIG. 5A is an intersection location $L_i$ associated with the pre-contrived electromagnetic-energy dispersion pattern 230 and indicative of where first and second extrapolated axes (not shown) fitted to the wavelength-impingement positions in the pre-contrived electromagnetic-energy dispersion pattern 230 would intersect. Although no extrapolated axes are shown in association with pre-contrived electromagnetic-energy dispersion pattern 230, it will be readily appreciated that the intersection location $L_i$ in FIG. 5A represents information analogous to the information represented by the intersection location $L_i$ shown in the graphically represented dispersion pattern of FIG. 3, which does illustrate first and second extrapolated axes $A_{E1}$ and $A_{E2}$ fitted to wavelength-impingement positions associated with an actual registered event.

At step 730, the spectral analysis system 100 is caused to monitor a predetermined field of view by registering at the imaging-sensor array 300, and storing in computer memory 215, at least first and second quasi-image-data frames $D_{f1}$ and $D_{f2}$ temporally separated from one another by a predetermined time interval (e.g., $T_2-T_1$). Each quasi-image-data frame has associated therewith data representing a scene within the field of view over a predetermined set of wavelengths. Illustrative first and second quasi-image-data frames $D_{f1}$ and $D_{f2}$ are shown stored in computer memory 215 in FIG. 2. If an event of interest is within the field of view when either of the first and second quasi-image-data frames $D_{f1}$ and $D_{f2}$ is registered, polychromatic electromagnetic energy emitted from the event to be analyzed is caused to pass through the optical system 400 such that the set of optical dispersion apparatus 420 disperses a selected plurality of constituent wavelengths therein and such that the dispersed wavelengths impinge simultaneously upon the focal plane $P_F$ and the sensors 310 of the imaging-sensor array 300 in a dispersion pattern DP, as shown, for example, in each of FIGS. 2 and 2A. Data 250 indicative of the registered dispersion pattern 255 is stored in computer memory 215 in association with at least one of the first and second quasi-image-data frames $D_{f1}$ and $Df_2$.

While the spectral analysis system 100 with register dispersion patterns 255 originating from events of interest within the field of view, the system will also register, and store in computer memory 215, registered dispersion patterns 255 from events other than events of interest. Accordingly, the spectral analysis system 100 is programmed to execute algorithmic operations upon quasi-image-data frames in order to differentiate those that may contain signatures representing events of interest from those that do not. Referring again to FIG. 7, at step 740, the data processing system 200 selects two quasi-image-data frames stored in computer memory 215 and algorithmically subtracts a first quasi-image-data frame $D_{f1}$ from a temporally-separated second quasi-image-data frame $D_{f2}$ to yield a difference-data set $D_s$ representative of the difference in energy intensity between the first and second quasi-image-data frames $D_{f1}$ and $D_{f2}$ at each wavelength of a selected plurality of wavelengths.

Figure 8:
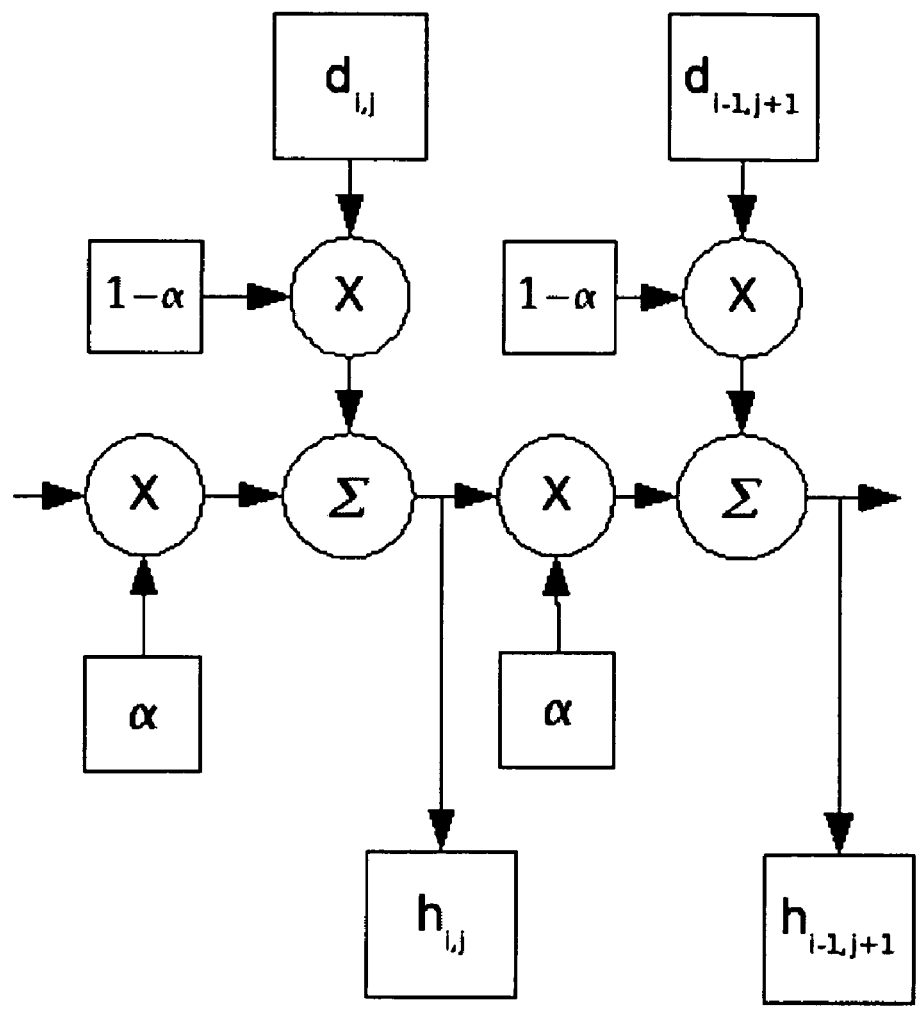
FIG. 8 is a block diagram of an illustrative algorithmic event-detection filter.

At step 750, an algorithmic detection filter DF is executed. The detection filter DF, which is shown in FIG. 2 as an aspect of the spectral analysis algorithms 220, analyzes the difference-data set $D_s$ and declares the presence within the predetermined field of view of an event of interest and, thereby, the presence of spectral image data representative of the event of interest in one of the first and second quasi-image-data frames $D_{f1}$ and $D_{f2}$, when a predetermined threshold filter value $V_{FT}$ is exceeded, and regards the quasi-image-data frame that is declared to contain data representative of the event of interest as a candidate-event-containing quasi-image-data frame $D_{fc}$. The candidate-event-containing quasi-image-data frame $D_{fc}$ has associated therewith in computer memory 215 a registered-dispersion-pattern data set (i.e., data 250 indicative of the registered dispersion pattern 255). As discussed in the summary, an illustrative detection filter DF for 1-dimensional data is of the form $$h_{i+1} = \alpha h_i + (1-\alpha) d_{i+1},$$

where $d_i$ are the data, $h_i$ is the IIR filter output and $\alpha$ is a constant between 0 and 1. A block diagram of an illustrative IIR filter is shown in FIG. 8.

Relative to a candidate-event-containing quasi-image-data frame $D_{fc}$, at step 760, an event-locating algorithm $L_A$, which is an aspect of the spectral analysis algorithms 220, is executed. The event-locating algorithm $L_A$ consults the attributed dispersion-pattern data set 235 associated with the optical system 400 and matches and co-orientates as closely as practicable a pre-contrived electromagnetic-energy dispersion pattern 230 (FIG. 5A) with the registered-dispersion-pattern data set 250 in order to approximate, with reference to the source-event location correlated with the matched and co-oriented pre-contrived electromagnetic-energy dispersion pattern 230, the location within the predetermined field of view of the object source event 500 that emitted the electromagnetic energy from which the registered dispersion pattern 255 was produced. More specific to the illustrative algorithmic operation of FIGS. 5A and 5B, the algorithm 220 is superimposing the pre-contrived electromagnetic-energy dispersion pattern 230 of FIG. 5A over the impingement-point map 260 of FIG. 6A, with the superposition being illustrated in FIG. 5B. The corresponding approximated map address for the non-dispersed image location NDIL is at x=16, y=15. As previously indicated in the summary and above in the detailed description, the correlation of relative impingement positions upon the focal plane $P_F$ with a location, within a predetermined field of view, of an emitting source event need not be made with regard or reference to a non-dispersed image location NDIL.

Figure 9:
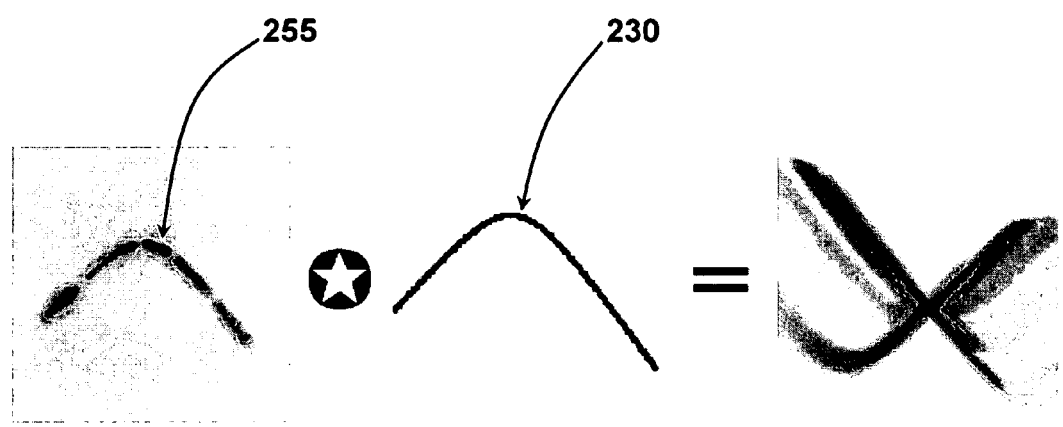
FIG. 9 is a graphical representation of an event signature (e.g., a registered dispersion pattern) being algorithmically correlated with an event template (e.g., a pre-contrived electromagnetic-energy dispersion pattern 230)
Figures 10, 11:
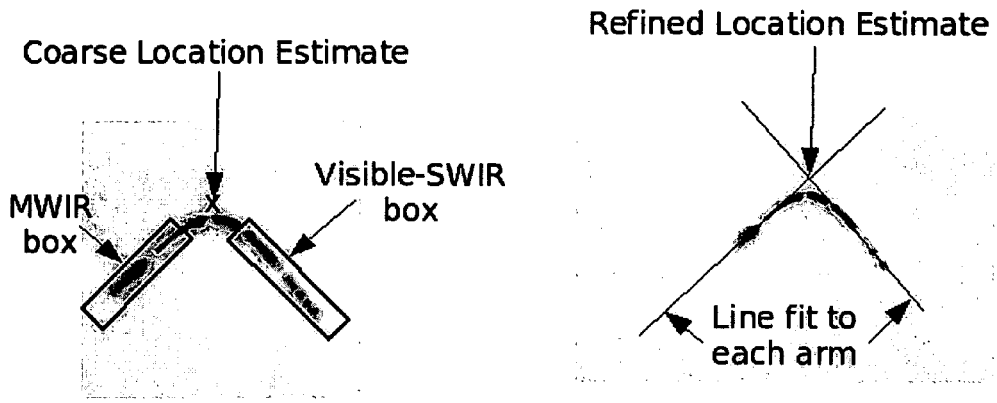
FIG. 10 graphically illustrates a coarse location-estimating process in which a box is defined around wavelength-impingement locations within each "arm" of a chevron-shaped dispersion pattern registered by an imaging-sensor array.
FIG. 11 shows the elements of an illustrative matrix associated with spectral-signature extraction for an event on which location estimation has been performed and in which the matrix describes the spatial-spectral mixing of an optical system associated with the imaging of the event.

In various aspects, location estimation essentially involves fitting a template to data 250 indicative of the registered dispersion pattern 255. With reference to FIGS. 9 and 10, an alternative, two-step location estimation process is described. The first step provides a coarse estimate of the location, which is accurate to the nearest pixel. The second step uses the coarse estimate to form a more accurate estimate. In one embodiment described in the summary, the coarse location estimate is implemented as a correlation of the form $$c_{m,n} = \sum_i \sum_j d_{i,j} t_{i-m, j-n}, \qquad (2)$$

where c is the correlation and t is a template obtained from an instrument calibration. Equation 2 is often expressed in abbreviated form $$c = d \star t, \qquad (3)$$

where the $\star$ indicates correlation. A graphical representation of an event signature (e.g., a registered dispersion pattern 255) correlated with the event template (e.g., a pre-contrived electromagnetic-energy dispersion pattern 230) is illustrated in FIG. 9. The pixel with the largest signal level (e.g., greatest intensity) yields the event location relative to the template location. In various implementations, the correlation is implemented as a Fourier transform. Each candidate frame (i.e., candidate-event-containing quasi-image-data frame $D_{fc}$) is Fourier transformed, multiplied by the archived template (230) transform and inverse Fourier transformed. The brightest pixel in the resulting correlation image gives the event location to the nearest pixel.

Once the cross correlation yields an estimate of the event location, a more accurate estimate can be obtained by calculating where first and second non-parallel extrapolated axes $A_{E1}$ and $A_{E2}$ fit to the two arms of the chevron-shaped registered dispersion pattern 255 cross. Referring to FIG. 10, in one embodiment, the coarse location estimate is used to define two boxes. Lines are fit to the pixel values (e.g., addresses) within the boxes and extrapolated, and the point (intersection location $L_i$) where the lines cross provides a refined estimate of the event location.

Once the location of the source event is determined, spectral signature extraction can be accomplished. As shown at step 770, algorithmic signature extraction processing analyzes the difference-frame image (e.g., difference-data set $D_s$), which is free of scene clutter and imaging-sensor non-uniformities. The signature extraction algorithm $E_A$ inverts the spatial-spectral mixing introduced by, for example, the prisms 423 and 427 and other components of the optical system 400. In one implementation, the optical functionality of the prisms 423 and 427, and other optical components, is described by a system transfer function matrix, and an algorithm for inverting the optical functionality is implemented as an inversion of the system transfer function matrix.

In one implementation, the operation of the prism can be described by the matrix equation $$d = We \qquad (4)$$

where d is the quasi-image data, W a matrix that describes the spatial-spectral mixing of the prism and e is the event signature. Here the 2-dimensional quasi-image data has been rearranged into a vector by reordering the 2-D data into a 1-D vector. The order of the data in the vector is important only in that it is consistent for both d and W. It is to be understood that any arrangement of the elements is within the scope and contemplation of the invention.

Figure 12:
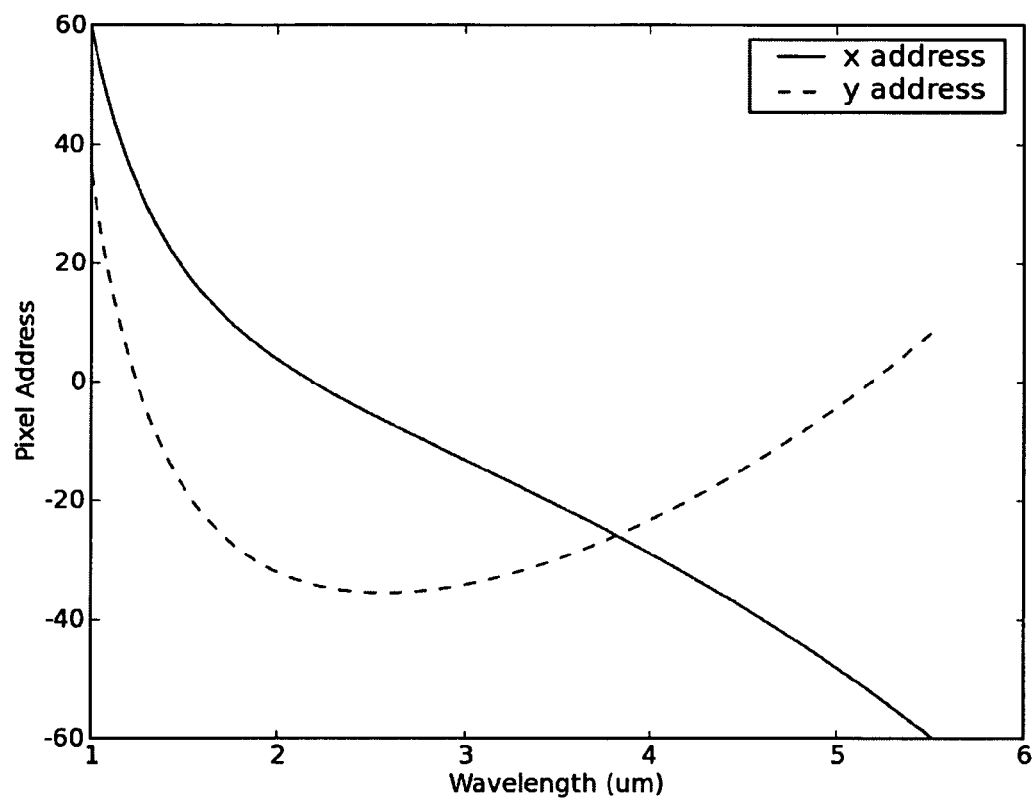
FIG. 12 is a graph showing pixel address (e.g., row and column address) as a function of wavelength relative to a common reference (e.g. a pixel or other reference) as determined from a calibration of an illustrative optical system used to acquire event images.

The elements of the vector e are the event signature data (i.e., data 250 indicative of the registered dispersion pattern 255) sampled at wavelengths $\lambda_1, \lambda_2, \lambda_3$, etc. In various implementations, the wavelengths are selected with sufficient sampling to be consistent with the observed quasi-image data. As a general observation, the spatial-spectral mixing of the optical system 400 for adjacent wavelengths $\lambda_i$ and $\lambda_{i+1}$ should lead to a spatial separation on the order of a pixel in the quasi image data (e.g., quasi-image-data frame $D_{fc}$). However, it is to be understood that both courser and finer spectral sampling are within the scope and contemplation of the invention. The number of elements in the vector e depends on the number of events present in the scene. The matrix multiplication of Equation 4 above is expanded in FIG. 11. The index for the $w_{i,j}$ corresponds to the pixel's address in the quasi-image-data frame and the address $(x_k, y_k)$ corresponds to the location of event k in the quasi-image-data frame. The elements of W are given by $$w_{i,j}(x_k, y_k, \lambda_m) = p(x_i - x_k - x(\lambda_m), y_j - y_k - y(\lambda_m)), \qquad (6)$$

where p(x,y) is the spread function of the event signature at the image plane, $(x_i, y_i)$ is the pixel address in the quasi-image data frame, and the functions $x(\lambda_m)$ and $y(\lambda_m)$ represent the functional relationship of the chevron-shaped dispersion pattern in terms of x- and y-coordinates as a function of wavelength. A graphical illustration of the functional relationship for the x- and y-coordinates as a function of wavelength is shown in FIG. 12. More specifically, FIG. 12 illustrates the prism or optical system calibration indicating the row and column address as a function of wavelength relative to a common reference. The event spectra are obtained (i.e., the signature is extracted) by solving the linear system of equations in Eqs. 4 and 5 for the event signature. In one embodiment the solution is obtained by inverting the matrix equation $$e = W^{-1}d \qquad (7)$$

However, when the spread function of the event is larger than a pixel, the matrix W can be ill-conditioned and it is understood that treatment of the potentially ill-conditioned matrix by techniques such as the regularized pseudo-inverse are both within the scope and contemplation of the invention and susceptible to comprehension by persons of ordinary skill in the relevant art.

In an alternate implementation, the quasi-image-data frame is resampled along the chevron-shaped spectral signature based on the optical system calibration (e.g. the data shown in FIG. 12). Resampling is less computationally demanding than the matrix inversion, but yields spectra with inferior resolution than can be obtained with matrix inversion.

False alarm rejection utilizes differences between the spectral features of prominent false targets and those of the spectra in the event dictionary. In various versions, spectral signatures exhibiting significant energy in spectral regions of strong atmospheric absorption are rejected.

Events that are not rejected are associated with events from previous frames that are spatially adjacent. This spatial association leads to the development of event tracks and enables the assembly of spectral-temporal signatures for moving events. Spatial association is performed based on the proximity of the event location to the location of events in the proceeding frame. If the two event locations are within a threshold radius of each other, then the new event is associated with the prior event.

Figure 13:
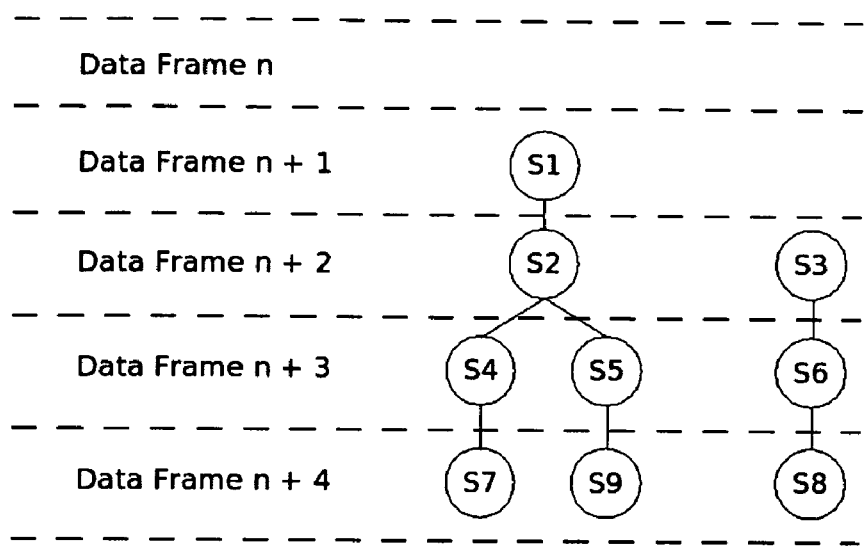
FIG. 13 is schematic representation of an illustrative event-track association indicating the evolution of three event tracks, two of which share a common root.

In various implementations, the processing supports multiple event tracks simultaneously. Each event discovered in a given frame is associated with all preexisting tracks. Those events that meet the criteria to associate with an existing track propagate that event track. Those that do not propagate existing event tracks initiate a new track. If multiple events associate with a single track, the track splits and multiple tracks with a common root are propagated. An illustration of the track algorithm is shown in FIG. 13. FIG. 13 is schematic representation of an illustrative track association indicating the evolution of three tracks, two of which share a common root. In this case, zero events are detected on Frame n, one event is detected on Frame n+1, two events are detected on Frame n+2, and three events are detected on Frames n+3, and n+4. Once an event has been assigned to a track (either existing or new) the pixels in the quasi-image difference frame associated with the event chevron are set to zero and the difference frame is searched for additional events.

In various implementations, an event track is completed after a predetermined number of frames (e.g., a fixed time period). While the track may continue, the need to initiate countermeasures or otherwise react to the track limits the time that can be expended assembling the track. Once a track exceeds the time limit, the composite signature is passed to the classification algorithm.

Classification of an event signature relies on comparison of the measured signature $y_i$ to the event signatures dictionary $\mu_j$. In various implementations, all of the available information is used in classification. This includes the temporal evolution of both the spectra and the track location.

An event is classified if the event signature is "sufficiently resembles" a stock event signature contained in the signature dictionary, wherein "sufficiently resembles" is defined in terms of a threshold resemblance value. In one version, a Bayesian classifier is used to determine the likelihood that an event is from a given class. In this case, the density function for the class distribution is assumed to be Gaussian, and the probability that a signature $y_i$ is from class $\omega_j$ is $$\hat{p}(y_i \mid \omega_j) = \frac{1}{\sqrt{(2\pi)^d |\Sigma_j|}} \exp\left(-\frac{1}{2}(y_i - \mu_j)^T \sum_j^{-1} (y_i - \mu_j)\right), \quad (8)$$

where $\Sigma_j$ and $\mu_j$ are the covariance matrix and mean of the class $\omega_j$, respectively. In this version, the signatures $y_i$ and $\mu_j$ are normalized so that the signal level will not vary with range and viewing aspect. The covariance matrix $\Sigma_j$ is defined as $$j = \langle (x_j - \mu_j)(x_j - \mu_j)^T \rangle \quad (9)$$

where $\langle \rangle$ indicates expectation over the events $x_j$ in class $\omega_j$. In alternative implementations, the covariance matrix is estimated from event signature models, or is idealized in some way (e.g., approximated as an identity matrix).

The foregoing is considered to be illustrative of the principles of the invention. Furthermore, since modifications and changes to various aspects and implementations will occur to those skilled in the art without departing from the scope and spirit of the invention, it is to be understood that the foregoing does not limit the invention as expressed in the appended claims to the exact construction, implementations and versions shown and described.

What is claimed is:

1. A method of detecting the presence of a dynamic combustion source event of interest and acquiring and analyzing the spectral signature of the source event in order to approximate the location of the source event within a predetermined field of view, the method comprising:
   predetermining a set of combustion events of interest for which detection, location and identification is desired;
   providing a spectral analysis system comprising
      (i) a data processing system including a central processor and computer memory including at least one memory device communicatively linked to the processor;
      (ii) an imaging-sensor array adapted to detect wavelengths over a predetermined range of electromagnetic wavelengths, the imaging-sensor array being communicatively linked to the data processing system; and
      (iii) an optical system including a focusing element and being configured for imaging a dispersion pattern of electromagnetic energy emitted from a source event external to the optical system onto the imaging-sensor array, the optical system furthermore being characterized at least in part by a set of attributed pre-contrived electromagnetic-energy dispersion patterns including at least one dispersion signature correlating a source-event location, within a predetermined field of view, with impingement positions upon the imaging-sensor array of a plurality of dispersed wavelengths within the sensitivity range of the imaging-sensor array, the optical system including a selected set of optical dispersion apparatus including a first set of optically dispersive elements that disperses a first selected set of wavelengths within the sensitivity range of the imaging-sensor array and a second set of optically dispersive elements that disperses a second selected set of wavelengths within the sensitivity range of the imaging-sensor array such that wavelengths emitted from an emitting source event that are within the first and second selected sets of wavelengths impinge simultaneously upon the imaging-sensor array along, respectively, a first extrapolated axis and a second extrapolated axis that is non-parallel to the first extrapolated axis, wherein the optical system is calibrated, and the first and second wavelength sets selected, such that each predetermined combustion event of interest emits wavelengths within each of the first and second wavelengths sets, thereby resulting in a dispersion pattern upon the imaging-sensor array that at least partially extends along each of two non-parallel extrapolated axes;
   maintaining in the computer memory a dispersion-pattern data set associating the optical system with data indicative of the set of pre-contrived electromagnetic-energy dispersion patterns;
   causing the spectral analysis system to monitor a predetermined field of view by registering at the imaging-sensor array, and storing in the computer memory, at least two quasi-image-data frames temporally separated from one another by a predetermined time interval, each quasi-image-data frame having associated therewith data representing a scene within the field of view over a predetermined set of wavelengths;
   algorithmically subtracting a first quasi-image-data frame from a temporally-separated second quasi-image-data frame to yield a difference-data set representative of the difference in energy intensity between the first and second quasi-image-data frames at each wavelength of a selected plurality of wavelengths;
   executing an algorithmic detection filter that analyzes the difference-data set and declares the presence within the predetermined field of view of an event of interest and, thereby, the presence of image data representative of the event of interest in one of the first and second quasi-image-data frames, when a predetermined threshold filter value is exceeded, and regarding the quasi-image-data frame that is declared to contain data representative of the event of interest as a candidate-event-containing quasi-image-data frame, the candidate-event-containing quasi-image-data frame having associated therewith in the computer memory a registered-dispersion-pattern data set; and
   relative to a candidate-event-containing quasi-image-data frame, executing an event-locating algorithm that consults the dispersion-pattern data set associated with the optical system and matches and co-orientates as closely as practicable a pre-contrived electromagnetic-energy dispersion pattern with the registered-dispersion-pattern data set in order to approximate, with reference to the source-event location correlated with the matched and co-oriented pre-contrived electromagnetic-energy dispersion pattern, the location within the predetermined field of view of the object source event that emitted the electromagnetic energy from which the registered dispersion pattern was produced.

* * * * *